United States Patent
Pasupathi

(10) Patent No.: US 10,782,744 B2
(45) Date of Patent: Sep. 22, 2020

(54) FLEXIBLE HINGE SYSTEM FOR A LAPTOP COMPUTER

(71) Applicant: International Business Machines Corporation, Armonk, NY (US)

(72) Inventor: Ranjeeth Pasupathi, Coimbatore (IN)

(73) Assignee: International Business Machines Corporation, Armonk, NY (US)

(*) Notice: Subject to any disclaimer, the term of this patent is extended or adjusted under 35 U.S.C. 154(b) by 36 days.

(21) Appl. No.: 16/182,155

(22) Filed: Nov. 6, 2018

(65) Prior Publication Data

US 2020/0142455 A1 May 7, 2020

(51) Int. Cl.
*G06F 1/16* (2006.01)

(52) U.S. Cl.
CPC .......... *G06F 1/1683* (2013.01); *G06F 1/1618* (2013.01)

(58) Field of Classification Search
CPC .... G06F 1/1615; G06F 1/1633; G06F 1/1675; G06F 1/1681; G06F 1/1683; F16M 11/2078
USPC .......................... 361/679.02, 679.06, 679.26
See application file for complete search history.

(56) References Cited

U.S. PATENT DOCUMENTS

| | | | | |
|---|---|---|---|---|
| 5,449,359 A * | 9/1995 | Groiso | ............... | A61B 17/0642 411/459 |
| 5,489,078 A * | 2/1996 | Risley | ....................... | B60R 7/05 224/247 |
| D393,201 S * | 4/1998 | Hearidge | ....................... | D8/395 |
| 6,082,692 A * | 7/2000 | Price | ................... | A47B 21/0314 248/278.1 |
| 6,104,443 A * | 8/2000 | Adcock | .................. | F16M 11/08 248/188.7 |
| 6,198,624 B1 | 3/2001 | Margaritis | | |
| 6,648,376 B2 * | 11/2003 | Christianson | ............. | E03C 1/06 138/120 |
| 7,035,092 B2 * | 4/2006 | Hillman | ................. | F16M 11/10 285/184 |
| 7,142,415 B2 * | 11/2006 | Hillman | ................. | F16M 11/10 361/679.06 |

(Continued)

FOREIGN PATENT DOCUMENTS

WO 1998045769 A1 10/1998

OTHER PUBLICATIONS

Alibaba, "Silicone flexible metal gooseneck tubing, bendable metal pine," www.alibaba.com/product-detail/Silicone-flexible-metal-gooseneck-tubing-bendable_548756350.html?spm=a2700.7724857.normalList.12.78374e35BWTiwT (https://www.alibaba.com/product-detail/Silicone-flexible-metal-gooseneck-tubing-bendable_548756350.html?spm=a2700.7724857.normalList.12.78374e35BWTiwT), printed Nov. 5, 2018, 3 pgs.

(Continued)

Primary Examiner — Anthony Q Edwards
(74) Attorney, Agent, or Firm — Peter K. Suchecki

(57) ABSTRACT

Provided is a flexible hinge system for a laptop computer. The flexible hinge system includes a base that is removably secured to a monitor via an elongated flexible member. The elongated flexible member includes a plurality of rotatable hinge segments, wherein a first distal end of the elongated flexible member is removably secured to the base, and a second distal end of the elongated flexible member is removably secured to the monitor. The monitor is adjustable relative to the base, such that once positioned, the monitor remains in a stationary position when supported by elongated flexible member and the base.

18 Claims, 7 Drawing Sheets

(56) References Cited

U.S. PATENT DOCUMENTS

| | | | | |
|---|---|---|---|---|
| 7,218,510 | B2 * | 5/2007 | Hillman | F16M 11/10 248/160 |
| 7,337,808 | B2 * | 3/2008 | Shamir | E03C 1/0408 138/120 |
| 7,533,906 | B2 * | 5/2009 | Luettgen | H01R 35/00 285/146.1 |
| 7,646,593 | B2 | 1/2010 | Smejkalova | |
| 7,724,511 | B2 | 5/2010 | Jacobs | |
| 7,861,985 | B2 | 1/2011 | Galvin | |
| D645,865 | S * | 9/2011 | Diehl | D14/299 |
| 8,201,778 | B2 * | 6/2012 | Yamamoto | F16L 3/015 174/525 |
| 8,390,997 | B1 | 3/2013 | Dominy | |
| D712,729 | S * | 9/2014 | Cushing | D8/395 |
| D750,476 | S * | 3/2016 | Huang | D8/395 |
| 9,958,109 | B2 * | 5/2018 | Li | F16M 11/2042 |
| D827,648 | S * | 9/2018 | Mitchell | D14/432 |
| 2004/0228077 | A1 | 11/2004 | Hall | |
| 2006/0067039 | A1 * | 3/2006 | Williams | F16M 11/046 361/679.09 |
| 2007/0086155 | A1 | 4/2007 | Chen | |
| 2007/0152113 | A1 * | 7/2007 | Okuley | G06F 1/162 248/133 |
| 2007/0201197 | A1 * | 8/2007 | Hillman | F16M 11/08 361/679.06 |
| 2008/0019088 | A1 | 1/2008 | Williams | |
| 2008/0094792 | A1 * | 4/2008 | Chen | G06F 1/1616 361/679.06 |
| 2009/0095854 | A1 * | 4/2009 | Forbes | F16M 11/40 248/176.3 |
| 2010/0288895 | A1 | 11/2010 | Shamie | |
| 2011/0073743 | A1 | 3/2011 | Shamie | |
| 2019/0133315 | A1 * | 5/2019 | Sherman | F16M 13/00 |

OTHER PUBLICATIONS

Dell, "Octa TabletTail Spider Moneky—Holder," https://www.dell.com/en-us/work/shop/octa-tablettail-spider-monkey-holder/apd/a8696739/pc-accessories, printed Nov. 5, 2018, 4 pgs.

Mehta, "How is the laptop screen connected to the keyboard?", https://www.quora.com/How-is-the-laptop-screen-connected-to-the-keyboard, printed Aug. 31, 2018, 2 pgs.

Mossesgeld, R., "3-Fold Laptop Promises Good Display Ergonomics," https://www.tomsguide.com/us/triple-joint-laptop-vincent-liew,news-7145.html, Tom's Guide, 3 pgs., Jun. 21, 2010.

Practical Machinist, "Thread: What is the flexible stuff used for gooseneck machine tool lamps called?", https://www.practicalmachinist.com/vb/general/what-flexible-stuff-used-gooseneck-machine-tool-lamps-called-269304/, printed Aug. 31, 2018, 6 pgs.

Reddit, "How do I tell if a ribbon cable is loose?", https://www.reddit.com/r/techsupport/comments/3xo1t1/how_do_i_tell_if_a_ribbon_cable_is_loose/, printed Sep. 5, 2018, 4 pgs.

Wikipedia, "Gooseneck Lamp," https://en.wikipedia.org/wiki/Gooseneck_lamp, printed Aug. 31, 2018, 1 pg.

* cited by examiner

FLEXIBLE HINGE SYSTEM FOR A LAPTOP COMPUTER

BACKGROUND

The present disclosure relates generally to the field of computers, and more specifically, to a flexible hinge system for a laptop computer.

Laptop computers include a base and a monitor that are pivotally secured to each other via a hinge. The hinge is typically connected lengthwise along the rear portion of the base and the monitor allowing the laptop computer to open and close in a clam shell configuration. The clam shell configuration allows the laptop computer to retain a compact size and be easily portable.

SUMMARY

Embodiments of the present disclosure include a flexible hinge system for a laptop computer. The flexible hinge system includes a base removably secured to a monitor via an elongated flexible member. The elongated flexible member includes a plurality of rotatable hinge segments, wherein a first distal end of the elongated flexible member is removably secured to the base, and a second distal end of the elongated flexible member is removably secured to the monitor. The monitor is adjustable to a location relative to the base, such that once positioned, the monitor remains in a stationary position when supported by elongated flexible member and the base.

Additional embodiments of the present disclosure include an apparatus for connecting a laptop base to a computer monitor. The apparatus includes an elongated flexible gooseneck member having a first distal end and a second distal end. The first distal end includes a first removable hinge connector that physically connects the elongated flexible gooseneck member to a computer monitor. The second distal end includes a second removable hinge connector that physically connects the elongated flexible gooseneck member to a laptop base. The elongated flexible gooseneck member includes a hollow interior portion to act as a wiring conduit for one or more wires that connect the laptop base to the computer monitor.

Further embodiments of the present disclosure include method for assembling a laptop computer using a flexible hinge system. One or more wires are received through a hollow interior portion of an elongated flexible gooseneck member of the flexible hinge system. A first distal end of the one or more wires are connected to a computer monitor. A second distal end of the one or more wires are connected to a laptop base. A first removable hinge connector on a first distal end of the elongated flexible gooseneck member is connected to the computer monitor. A second removable hinge connector on a second distal end of the elongated flexible gooseneck member is connected to the laptop base.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
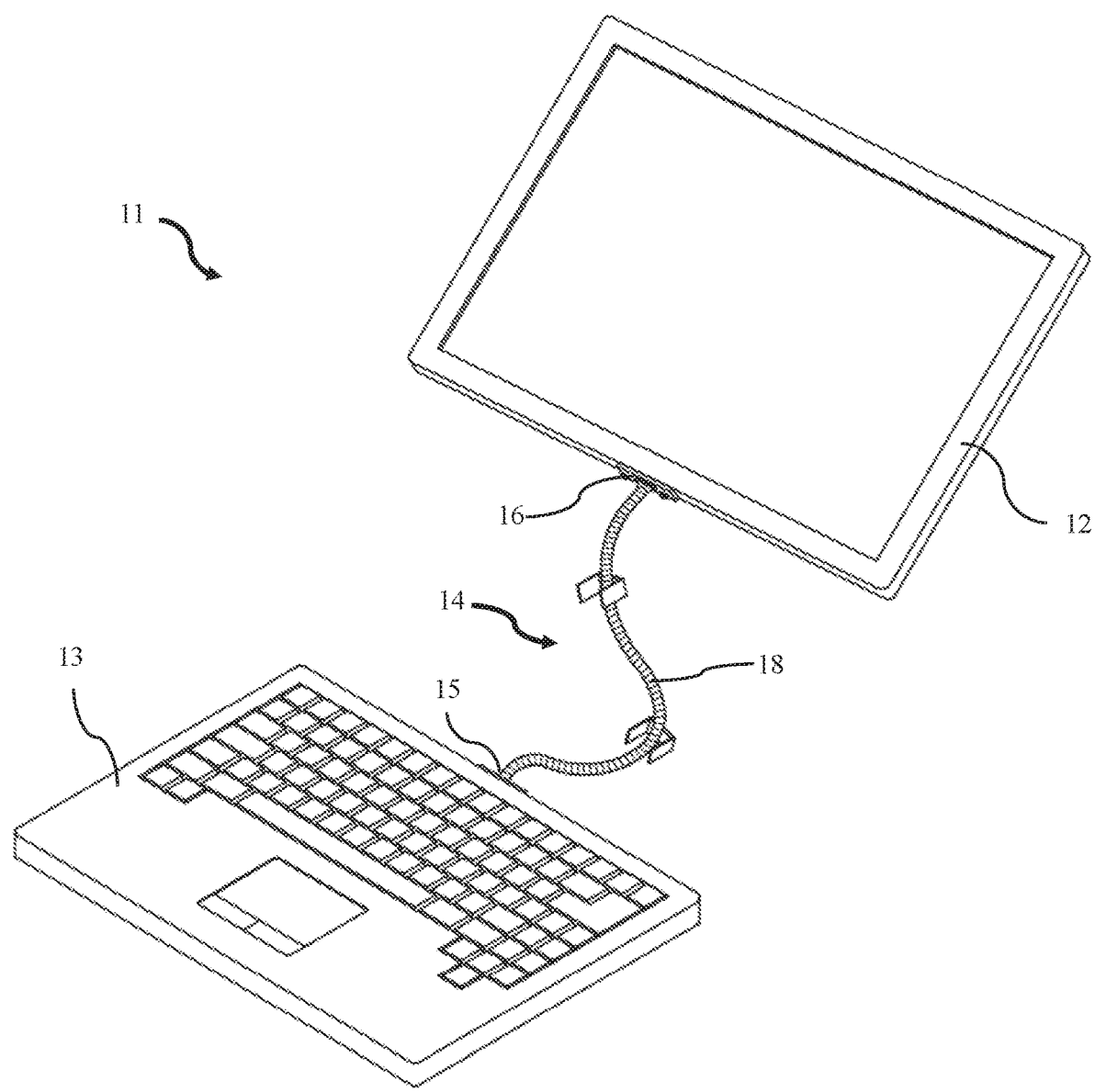
FIG. 1 illustrates a front perspective view of the flexible hinge system for a laptop computer, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of laptop computers, and in particular to a flexible hinge system for improving ergonomics while using a laptop computer. While the present disclosure is not necessarily limited to such applications, various aspects of the disclosure may be appreciated through a discussion of various examples using this context.

Most laptop computers include a monitor and a base that are pivotally secured to each other via a hinge. The hinge is typically connected lengthwise along the rear portion of the base and the monitor allowing the laptop computer to open and close in a clam shell configuration. The clam shell configuration allows the laptop to be closed and transported in a compact way, providing increased portability for the laptop computer. However, the compact configuration comes with drawbacks that compromise posture of a user by not providing an optimal ergonomic position when using the laptop computer. Because the monitor and base of the laptop are permanently linked, a user is unable to position either portion separately, thus leaving the user with limited options when adjusting the monitor and keyboard of the laptop during use.

The present disclosure provides a flexible hinge system that replaces the traditional hinge of a laptop computer. The flexible hinge system allows the monitor and the base of the laptop to be separately positioned such that a user can find an ideal ergonomic position during use. For example, the flexible hinge system allows a user to position the monitor at eye level, while the base (including the keyboard) may be positioned on the user's lap or desktop. This positioning prevents the user from having to lean over in such a way that may cause physical strain to the body (e.g., strain in the back, neck, arms, wrist). Further, the flexible hinge system includes one or more fasteners that allow the modified laptop computer to retain the functionality of the clam shell configuration (e.g., compact design) during use or transport.

It is to be understood that the aforementioned advantages are example advantages and should not be construed as limiting. Embodiments of the present disclosure can contain all, some, or none of the aforementioned advantages while remaining within the spirit and scope of the present disclosure.

Referring now to FIG. 1, shown is a front perspective view of the flexible hinge system 11 for a laptop computer, in accordance with embodiments of the present disclosure. The flexible hinge system 11 includes a base 13 and a monitor 12 that are connected via an elongated flexible member 14. In some embodiments, the base 13 includes a computer system and a keyboard. However, in other embodiments, the computer system may be disposed in another location (e.g., within the monitor 12 or in a separate device). In some embodiments, the elongated flexible member 14 may be utilized to replace a traditional hinge on a standard laptop computer. For example, the elongated flexible member 14 may include a hollow interior volume, wherein the wiring connecting the monitor 12 and the base 13 of the laptop computer (e.g., the laptop ribbon wiring) may be fed therethrough.

The elongated flexible member 14 comprises a plurality of rotatable hinge segments 18 that allow the flexible member 14 to bend into various configurations (e.g., curved, S-shaped, straight, etc.). In some embodiments the rotatable hinge segments 18 are disposed along the entire length of the elongated flexible member 14. For example, the plurality of rotatable hinge segments 18 may be disposed along the length of the elongated flexible member 14 in a gooseneck configuration. The plurality of rotatable hinge segments 18 are configured to remain in a stationary position once adjusted, such that the elongated flexible member 14 supports the weight of the monitor 12. It is contemplated that the rotatable hinge segments 18 are under a tension or friction fit that allows the hinge segments 18 to support the weight of the monitor 12 when in use, while further allowing the elongated flexible member 14 to be adjusted into any position when a force is applied by a user in any direction.

For example, a user may place the monitor 12 at eye level while the base 13 remains on the user's lap. Once the monitor 12 is positioned at eye level, the flexible member 14 is under a tension that allows the flexible member 14 to support the weight of the monitor 12, such that the monitor 12 remains stationary until a user applies further force to either the monitor 12 or the flexible member 14. The elongated flexible member 14 allows a user to position the monitor in any position relative to the base 13 when in an extended position, while the base 13 is configured to include a weight that prevents the system 11 from toppling over.

In the illustrative embodiment, a first distal end 15 of the elongated flexible member 14 is removably secured to the base 13, and a second distal end 16 of the elongated flexible member 14 is removably secured to the monitor 12. In some embodiments, the distal ends 15, 16 of the elongated flexible member 14 are secured to the base 13 and the monitor 12 using removably securable fasteners, such as screws. However, in other embodiments, any type of removably securable fastener may be used (e.g., clamps, magnetic fastener, etc.). In some embodiments, the elongated flexible member 14 may be connected to one or both of the monitor 12 and the base 13 such that it is not removable therefrom (e.g., the elongated flexible member 14 may be welded, riveted, glued, etc. to the monitor 12 and/or base 13).

In some embodiments, the flexible member 14 includes a hollow interior portion, such that one or more wires may be received therethrough. For example, the flexible member 14 may contain the necessary wires for operably connecting the monitor 12 to the base 13 (computer system and keyboard). However, in some embodiments the monitor 12 and base 13 may be wirelessly connected (e.g., a 2 in 1 laptop system), obviating the need for a hollow interior volume.

Figure 2A:
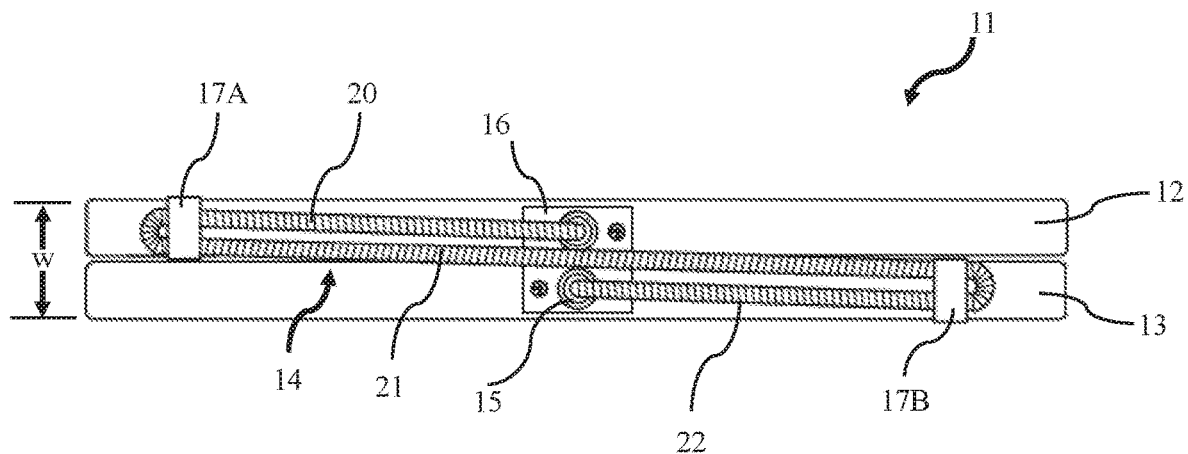
FIG. 2A illustrates a rear view of the flexible hinge system for a laptop computer in a closed position, in accordance with embodiments of the present disclosure.
Figure 2B:
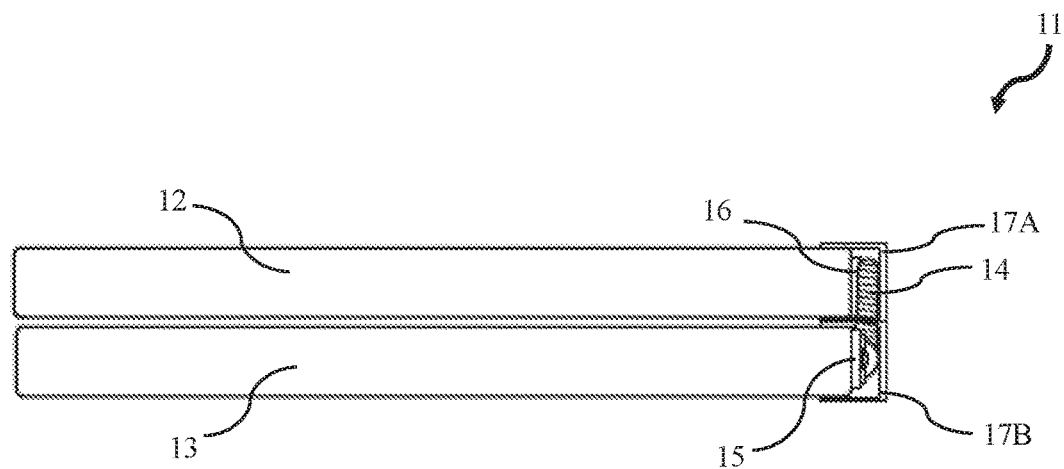
FIG. 2B illustrates a side view of the flexible hinge system for a laptop computer in a closed position, in accordance with embodiments of the present disclosure.

Referring now to FIG. 2A and FIG. 2B, shown is a rear view of the flexible hinge system 11 for a laptop computer in a closed position and a side view of the flexible hinge system 11 for a laptop computer in a closed position, respectively, in accordance with embodiments of the present disclosure. In the illustrative embodiments, the first distal end 15 of the elongated flexible member 14 is removably secured to the posterior side of the base 13 and the second distal end 16 of the elongated flexible member 14 is removably secured to a posterior side of the monitor 12. In some embodiments, the distal ends 16, 15 of the elongated flexible member 14 may be secured to any suitable position on the base 13 and monitor 12.

The elongated flexible member 14 includes one or more fasteners 17A-17B (collective referred to as fasteners 17) configured to secure the elongated flexible member 14 in a stored position. The fasteners 17 may be any type of fastener, such as a clamp, vise, or anchor that will restrict the movement of the flexible member 14 when in a stored position. In the illustrative embodiments, the flexible member 14 includes two fasteners 17A, 17B shown as clips. When in the stored position, the first fastener 17A is configured to secure a first distal portion 20 and a middle portion 21 of the elongated flexible member 14 to the monitor 12, while the second fastener 17B is configured to secure a second distal portion 22 and the middle portion 21 of the elongated flexible member 14 to the base 13. The fasteners 17 are configured to secure the elongated flexible member 14 in a stored position, such that the elongated flexible member 14 operates similarly to a hinge on a standard laptop computer (e.g., the monitor and base opening and closing in a clam shell configuration). The stored position prevents the monitor 12 and base 13 from separating when opening and closing the laptop computer. As shown in FIG. 2A, the fasteners 17 of the flexible member 14 are positioned near the lateral edges of the posterior sides of the monitor 12 and base 13 when in the stored position. However, in some embodiments, the fasteners 17 may be positioned anywhere along the flexible member.

The elongated flexible member 14 is foldable into a stored position, such that the screen portion (not shown) of the monitor 12 and the face (not shown) of the base 13 (e.g., keyboard) rest flush with each other when in a closed position. As shown in FIG. 2A, when in the stored position the elongated flexible member 14 resembles a compressed S-shape, such that the first distal portion 20 and the second distal portion 22 are stacked upon the middle portion 21 of the flexible member 14. When the monitor 12 and base 13 are in the closed position, the combined width of the first distal portion 20, the second distal portion 22, and the middle portion 21 of the elongated flexible member 14 when in the stored position is less than a total width W of the posterior side of the monitor 12 and the posterior side of the base 13. This configuration prevents any excess width of the elongated flexible member 14 from extending outwardly from the system 11 where it may get caught or snagged on an object during transport. As shown in FIG. 2A, the elongated flexible member 14 is no more than twice the length of a longitudinal side of the base 13 or monitor 12. When in the stored position, the length of the flexible member 14 allows the monitor 12 and the base 13 to be in a closed or open position without having an excess portion of the flexible member 14 protruding from the lateral edges.

Figure 3A:
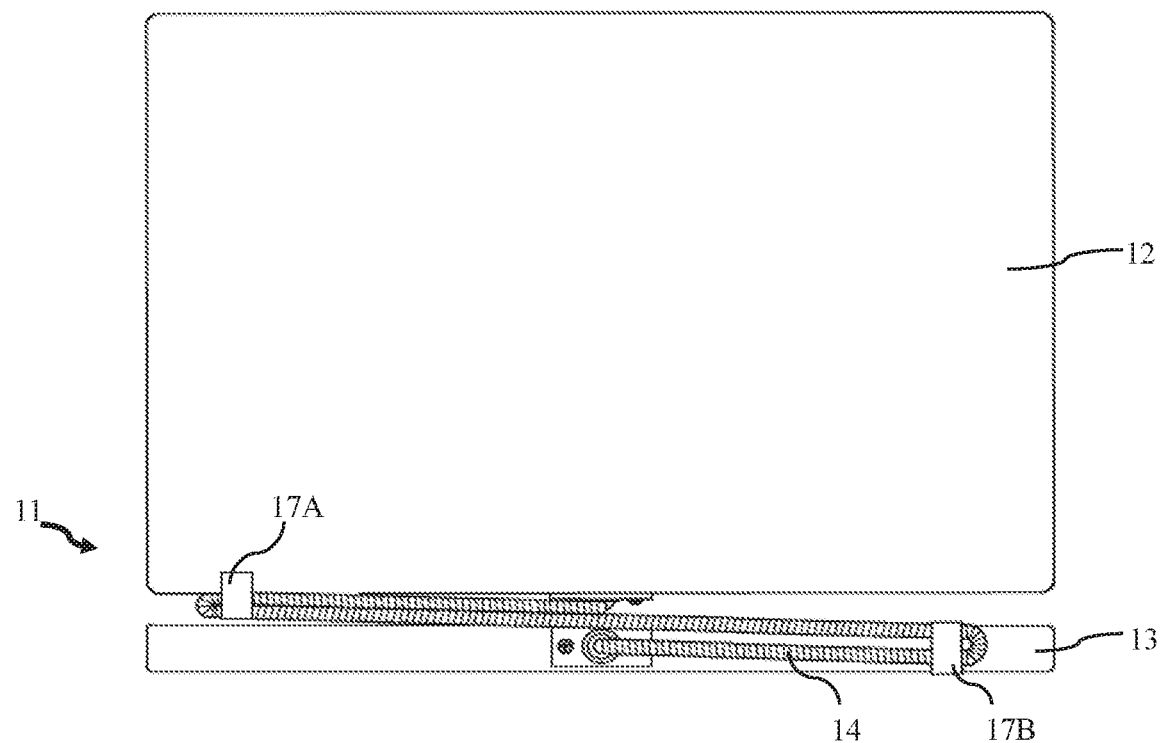
FIG. 3A illustrates a rear view of the flexible hinge system for a laptop computer in an open position, in accordance with embodiments of the present disclosure.
Figure 3B:
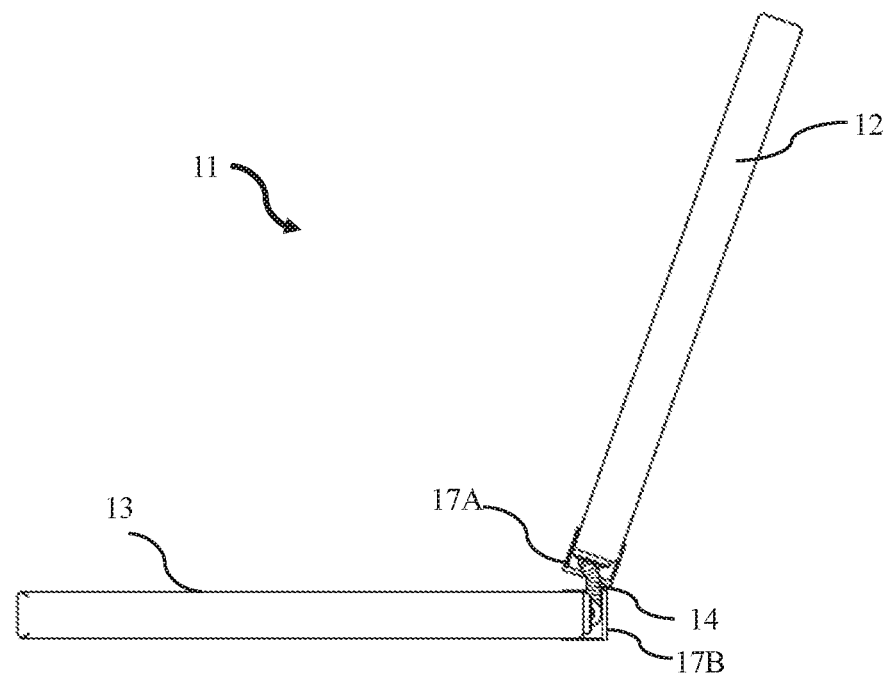
FIG. 3B illustrates a side view of the flexible hinge system for a laptop computer in an open position, in accordance with embodiments of the present disclosure.

Referring now to FIG. 3A and FIG. 3B, shown is a rear view of the flexible hinge system 11 for a laptop computer in an open position and a side view of the flexible hinge system 11 for a laptop computer in an open position, respectively, in accordance with embodiments of the present disclosure. The elongated flexible member 14 performs like a standard laptop hinge when placed in the stored position, allowing the monitor 12 to open away from the base 13. When in the stored position, the first fastener 17A is configured to secure the flexible member 14 to the monitor 12, while the second fastener 17B is configured to secure the flexible member 14 to the base 13, allowing the monitor 12 to be in an open position without separating from the base 13. The stored position allows the flexible hinge system 11 to retain the functionality of a standard laptop computer when extending the monitor 12 is not needed.

Figure 4A:
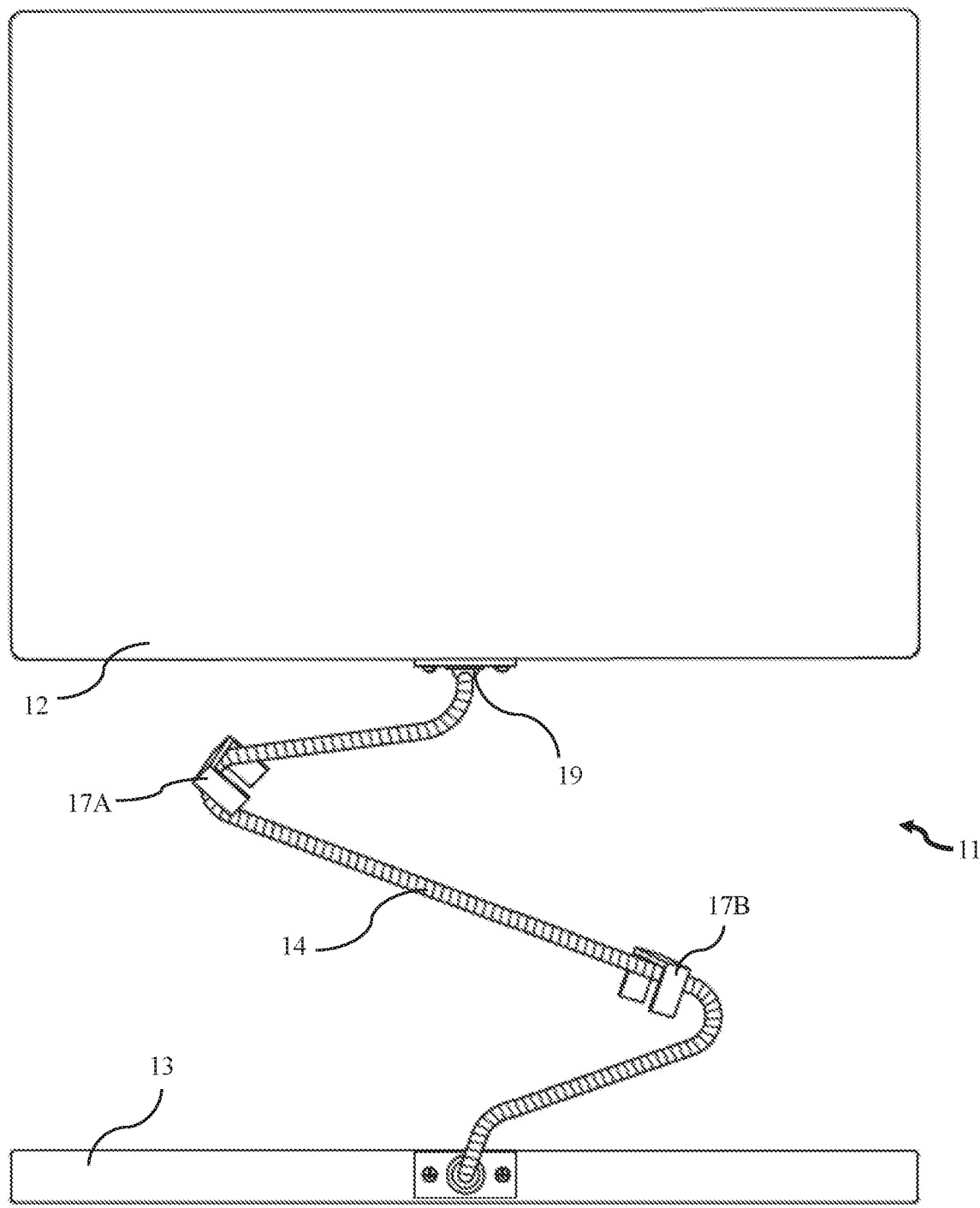
FIG. 4A illustrates a rear view of the flexible hinge system for a laptop computer in an extended position, in accordance with embodiments of the present disclosure.
Figure 4B:
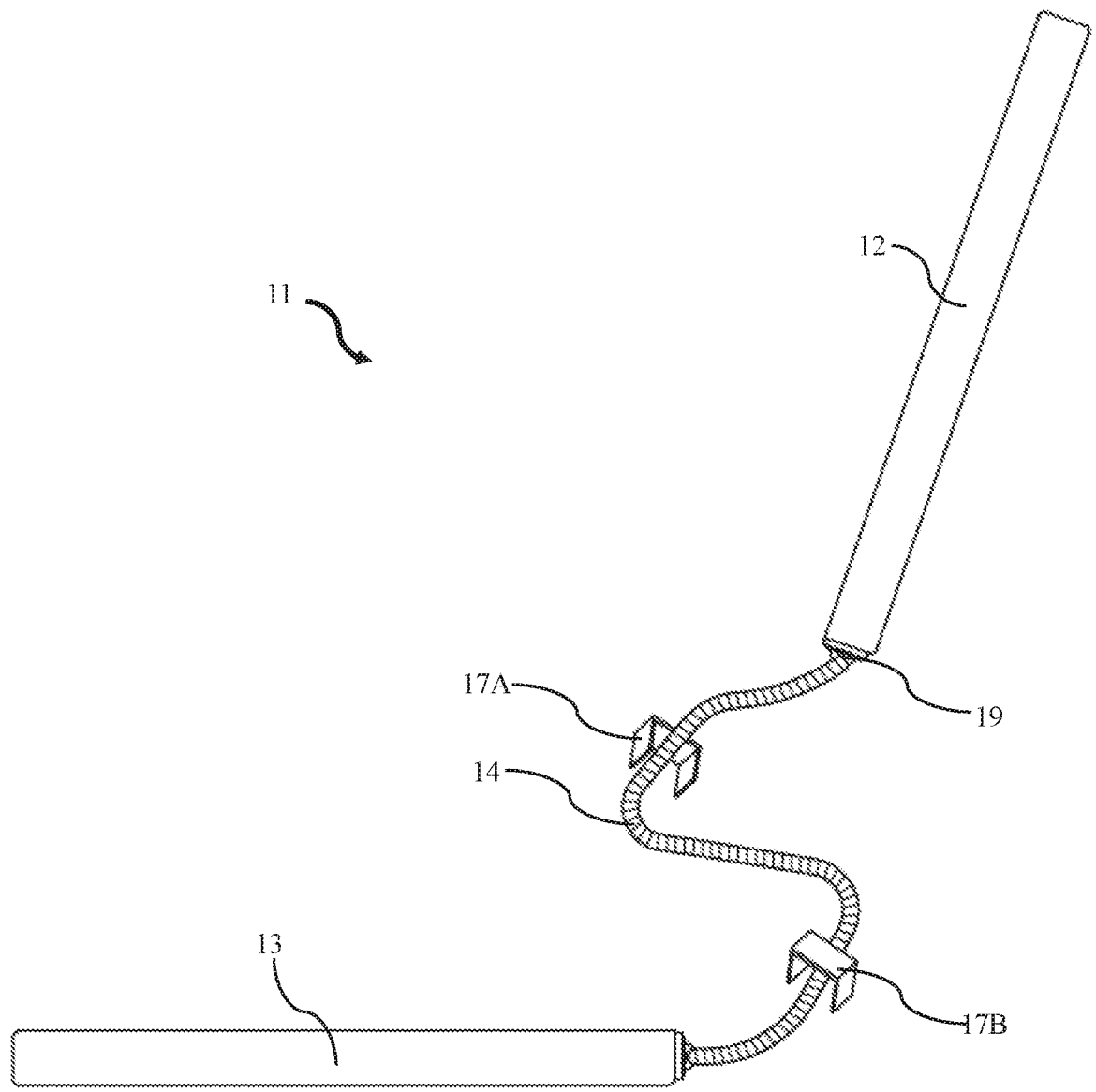
FIG. 4B illustrates a side view of the flexible hinge system for a laptop computer in an extended position, in accordance with embodiments of the present disclosure.

Referring now to FIG. 4A and FIG. 4B, shown is a rear view of the flexible hinge system 11 for a laptop computer in an extended position and a side view of the flexible hinge system 11 for a laptop computer in an extended position, respectively, in accordance with embodiments of the present disclosure. The elongated flexible member 14 may be placed in an extended position when the fasteners 17A, 17B are released from the stored position. Once the fasteners 17 are released from the stored position, the monitor 12 may be positioned in any location relative to the base 13. The extended position allows a user to place the monitor 12 at the perfect viewing level to improve ergonomics when using the laptop computer. The plurality of rotatable hinge segments allow the monitor 12 to be supported by the elongated flexible member 14 and the base 13, such that the monitor remains stationary once positioned to a preferred location by a user.

In some embodiments, the flexible member 14 may include a rotatable ball joint 19 at the distal end(s). The rotatable ball joint 19 allows the monitor 12 to easily rotate 360 degrees around the longitudinal axis of the elongated flexible member 14. In this way, the rotatable ball joint 19 provides additional monitor viewing angles for the user.

Figure 5:
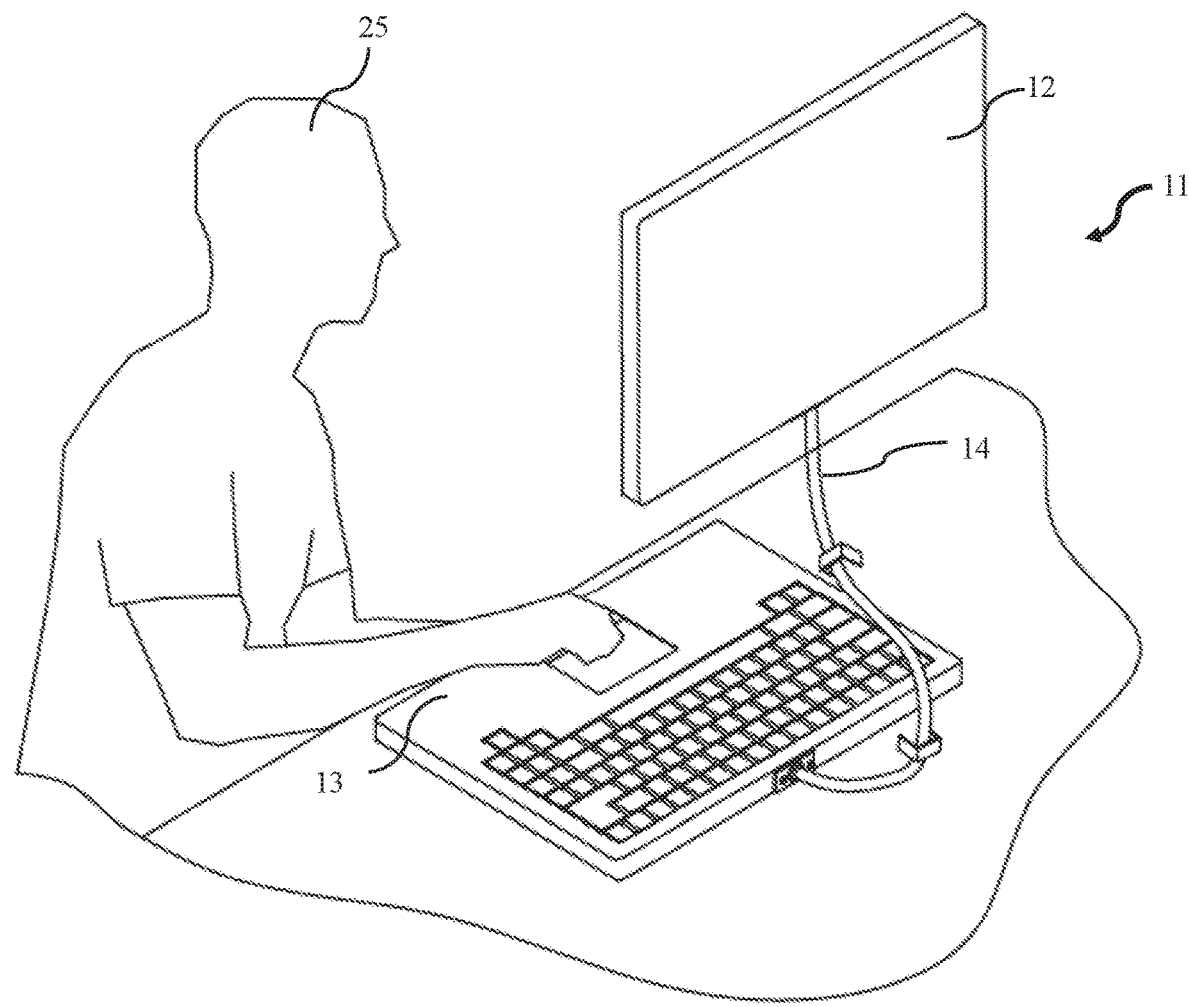
FIG. 5 illustrates a rear perspective view of the flexible hinge system for a laptop computer, in accordance with embodiments of the present disclosure.

Referring now to FIG. 5, shown is a rear perspective view of the flexible hinge system 11 for a laptop computer, in accordance with embodiments of the present disclosure. In the illustrative embodiment, a user 25 may place the elongated flexible member 14 in the extended position, such that the monitor 12 is level with the user's eye line, while the base 13 of the system 11 may remain in an easily accessible position for typing, such as on a desk or lap of a user. In this way, the positioning of the monitor 12 allows the user to sit in a comfortable ergonomic position to assist in preventing strain on the user's body.

Figure 6:
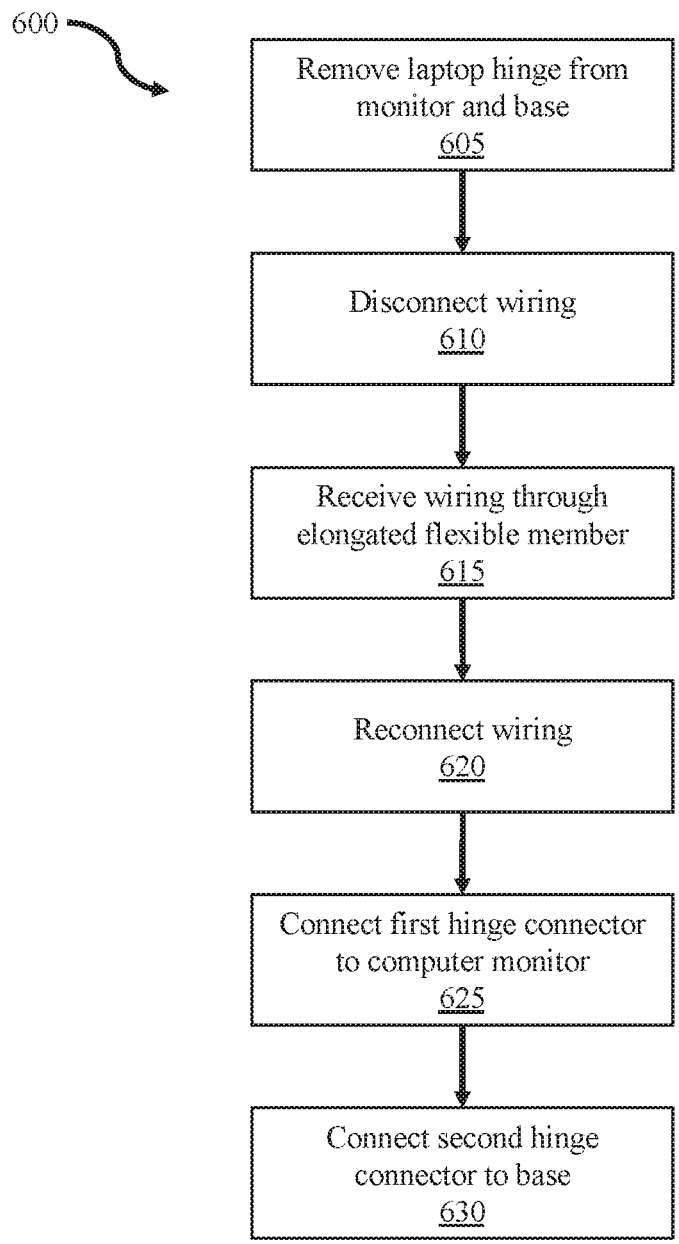
FIG. 6 illustrates a flow diagram of an example method for assembling a laptop computer using a flexible hinge system, in accordance with embodiments of the present disclosure.

Referring now to FIG. 6, shown is a flow diagram of an example process 600 for assembling a laptop computer using a flexible hinge system, in accordance with embodiments of the present disclosure. The process 600 utilizes the flexible hinge system as described in FIG. 1. In some embodiments, the flexible hinge system is used to replace a hinge on a standard laptop computer. In such an embodiment, the hinge of the laptop computer may first be removed from the monitor and the laptop base (e.g., keyboard). This is illustrated in step 605. Once the hinge has been removed, one or more wires connecting the laptop base to the computer monitor may be disconnected. This is illustrated in step 610. In some embodiments, only one end of the wiring may be disconnected. In other embodiments, both ends of the wiring may be disconnected. Once disconnected, a first end of the wiring may be received through the hollow interior portion of the elongated flexible member. This is illustrated in step 615. In some embodiments, the wiring may be replaced to accommodate for the length of the elongated flexible member. For example, the wiring on a standard laptop computer may not be long enough to traverse the length of the elongated flexible member and therefore must be replaced. Once the wiring is fed through the elongated flexible member, the ends of the wiring may be reconnected to the monitor and base. This is illustrated in step 620.

The process 600 continues by connecting a first removable hinge connector on the first distal end of the elongated flexible member to the computer monitor. This is illustrated in step 625. The process 600 continues by connecting a second removable hinge connector on the second distal end of the elongated flexible member to the base. This is illustrated in step 630. The first and second removable hinge connectors may be any type of connector, such as a clip or threaded connection (e.g., a screw). In some embodiments, holes may need to be drilled into the housing of the monitor and the base in order to connect the first and second removable hinge connectors to the monitor and base, respectively.

In some embodiments, the order of operations for process 600 may vary and additional or fewer steps may be included. For example, only one distal end of the wiring connecting the monitor to the base may need to be removed. In another example, the wiring necessary to connect the monitor to the base may not initially be connected, thus obviating the need to disconnect any wiring.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding of the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to those skilled in the art. Therefore, it is intended that the following claims be interpreted as covering all such alterations and modifications as fall within the true spirit and scope of the disclosure.

What is claimed is:

1. A flexible hinge system for a laptop computer comprising:
    a base;
    a monitor;
    an elongated flexible member having a plurality of rotatable hinge segments, wherein a first distal end of the elongated flexible member is removably secured to the base, and a second distal end of the elongated flexible member is removably secured to the monitor; and
    one or more fasteners disposed along a length of the elongated flexible member positioned between the distal ends, wherein the one or more fasteners are configured to physically secure the length of the elongated flexible member to the base and the monitor when in a stored position,
    wherein the monitor is adjustable relative to the base, such that once positioned, the monitor remains in a stationary position when supported by elongated flexible member.

2. The flexible hinge system for a laptop computer of claim 1, wherein the one or more fasteners are clips.

3. The flexible hinge system for a laptop computer of claim 1, wherein the elongated flexible member includes a hollow interior portion, such that one or more wires may be received therethrough.

4. The flexible hinge system for a laptop computer of claim 1, wherein a plane of a screen of the monitor is rotatable 360 degrees around a longitudinal axis of the elongated flexible member.

5. The flexible hinge system for a laptop computer of claim 1, wherein the elongated flexible member is foldable into the stored position, such that a screen of the monitor and a face of a keyboard of the base rest flush with each other when in the stored position.

6. The flexible hinge system for a laptop computer of claim 5, wherein the elongated flexible member resembles an S-shape when in the stored position, such that a first distal portion and a second distal portion are stacked on a middle portion of the elongated flexible member.

7. The flexible hinge system for a laptop computer of claim 6, wherein a combined width of the first distal portion, the second distal portion, and the middle portion when in the stored position is less than a total width of a posterior side of the monitor and a posterior side of the base when in the stored position.

8. The flexible hinge system for a laptop computer of claim 1, wherein the first distal end of the elongated flexible member is removably secured to a posterior side of the base and the second distal end of the elongated flexible member is removably secured to a posterior side of the monitor.

9. The flexible hinge system for a laptop computer of claim 1, wherein the base comprises a weight configured to support the monitor in any position, such that the flexible hinge system will not topple over.

10. The flexible hinge system for a laptop computer of claim 1, wherein the first distal end and the second distal end of the elongated flexible member each include a rotatable ball joint.

11. The flexible hinge system for a laptop computer of claim 1, wherein the elongated flexible member is no more than twice a length of a longitudinal side of the base.

12. An apparatus for connecting a laptop base to a monitor, the apparatus comprising:
    an elongated flexible gooseneck member having a first distal end and a second distal end;
    a first removable hinge connector disposed at the first distal end of the elongated flexible gooseneck member, the first removable hinge connector being configured to physically connect the elongated flexible gooseneck member to a computer monitor;
    a second removable hinge connector disposed at the second distal end of the elongated flexible gooseneck member, the second removable hinge connector being configured to physically connect the elongated flexible gooseneck member to a laptop base; and
    one or more fasteners disposed along a length of the elongated flexible gooseneck member positioned between the distal ends, wherein the one or more fasteners are configured to physically secure the length of the elongated flexible gooseneck member to the laptop base and the computer monitor when in a stored position,
    wherein the elongated flexible gooseneck member includes a hollow interior portion configured to act as a wiring conduit for one or more wires that connect the laptop base to the computer monitor.

13. The apparatus of claim 12, wherein the first distal end and the second distal end of the elongated flexible gooseneck member each include a rotatable ball joint.

14. The apparatus of claim 12, wherein the elongated flexible gooseneck member resembles an S-shape when in the stored position, such that a first distal portion and a second distal portion are stacked on a middle portion of the elongated flexible gooseneck member.

15. The apparatus of claim 12, wherein the elongated flexible gooseneck member is no more than twice a length of a longitudinal side of the laptop base.

16. The apparatus of claim 12, wherein a plane of a screen of the computer monitor is rotatable 360 degrees around a longitudinal axis of the elongated flexible gooseneck member.

17. A method for assembling a laptop computer using a flexible hinge system, the method comprising:

receiving one or more wires through a hollow interior portion of an elongated flexible gooseneck member of a flexible hinge system, wherein the flexible hinge system comprises:
  an elongated flexible gooseneck member having a first distal end and a second distal end;
  a first removable hinge connector disposed at the first distal end of the elongated flexible gooseneck member, the first removable hinge connector being configured to physically connect the elongated flexible gooseneck member to a computer monitor;
  a second removable hinge connector disposed at the second distal end of the elongated flexible gooseneck member, the second removable hinge connector being configured to physically connect the elongated flexible gooseneck member to a laptop base,
  wherein the elongated flexible gooseneck member includes a hollow interior portion configured to act as a wiring conduit for one or more wires that connect the laptop base to the computer monitor; and
  one or more fasteners disposed along a length of the elongated flexible gooseneck member positioned between the distal ends, wherein the one or more fasteners are configured to physically secure the length of the elongated flexible gooseneck member to the laptop base and the computer monitor when in a stored position;
connecting a first distal end of the one or more wires to a computer monitor and a second distal end of the one or more wires to a laptop base;
connecting the first removable hinge connector on the first distal end of the elongated flexible gooseneck member to the computer monitor; and
connecting the second removable hinge connector on the second distal end of the elongated flexible gooseneck member to the laptop base.

18. The method of claim 17, the method further comprising:
  removing a laptop hinge connecting the computer monitor and the laptop base; and
  disconnecting one or more wires that communicatively couple the computer monitor to the laptop base.

\* \* \* \* \*